July 14, 1953     R. H. HILL     2,644,999
CONTROL APPARATUS Filed Jan. 6, 1947                              6 Sheets-Sheet 1

FIG. 1

INVENTOR.
ROBERT H. HILL
BY Wallace and Cannon
ATTORNEYS

July 14, 1953 R. H. HILL 2,644,999
CONTROL APPARATUS
Filed Jan. 6, 1947 6 Sheets-Sheet 3

INVENTOR.
ROBERT H. HILL
BY Wallace and Cannon
ATTORNEYS

July 14, 1953

R. H. HILL 2,644,999

CONTROL APPARATUS

Filed Jan. 6, 1947

INVENTOR.
ROBERT H. HILL
BY
*Wallace and Cannon*
ATTORNEYS

FIG. 11

INVENTOR.
ROBERT H. HILL
BY
Wallace and Cannon
ATTORNEYS

FIG. IIA

INVENTOR.
ROBERT H. HILL
BY Wallace and Cannon
ATTORNEYS

Patented July 14, 1953

2,644,999

UNITED STATES PATENT OFFICE 2,644,999

CONTROL APPARATUS

Robert H. Hill, Elgin, Ill., assignor to himself and Harold Hoffman, Elgin, Ill., jointly Application January 6, 1947, Serial No. 720,329

1 Claim. (Cl. 29—42)

This invention relates to automatic machines and particularly to the control of the successive operations of work-performing mechanisms in such automatic machines.

In automatic machines wherein a plurality of different work-performing mechanisms are operable in succession upon a workpiece, the matter of controlling and inter-relating the operations of the several work performing mechanisms has in every case constituted the most difficult and expensive problem involved in the production as well as the use of such machines. Resort has of course been had to direct or common drive of all of the several mechanisms of a machine so as to thereby attain the desired timed operation of all the work-performing mechanisms, while in other instances, a timing shaft or drum has been utilized to intermittently and sequentially actuate or control the actuation of the various mechanisms, or to control the starting and stopping of the operations or movements of the several mechanisms in sequence or other timed relation. In other instances, it has been customary to afford a controlling connection from each of the respective mechanisms to the next mechanism that it is to be operated, so that when a particular mechanism completes or reaches a predetermined point in the operation for which it is intended, it serves automatically to initiate the operation of the next mechanism that is to be effective.

While such prior expedients have functioned satisfactorily in many instances where but one kind or size of work is to be produced, the control apparatus required in said prior machines has in every case been quite costly and has not been adaptable for economical and convenient use where changes in the kind, size or characteristics of the work require changes and adjustments in the cycle of the machine and the sequence and extent of operation of the various work-performing mechanisms thereof, and to overcome such limitations in the control of automatic machines is the primary object of the present invention.

An example of a situation where the problem of controlling the operation of a plurality of work-performing mechanisms is encountered is afforded in the machine tool art where a succession of operations, often including automatic loading and unloading, are to be performed on each of a succession of workpieces. Machine tools must, of course, be adaptable for use on different sizes and kinds of workpieces and for different sequences and cycles of operation of the several work-performing mechanisms thereof, and to simplify and facilitate the attainment of such characteristics in machine tools and similar machines is a further object of the present invention.

In certain types of machine tools such, for example, as an automatic turret lathe, a plurality of operations are performed through movement of a single element of the machine, which in this case is the turret of the machine, and the turret must therefore move through different strokes with respect to the several operations that involve such turret movements. It is therefore another object of the present invention to enable sensing means to sense the completion of any one of such different strokes of such a movable machine element, and a more specific object is to enable a plurality of independent sensing means to be afforded in association with such a member of an automatic machine, and to control the effectiveness of the respective sensing means so that although such sensing means are operated in each cycle of movement of the member with which they are allocated, such sensing means are effective in controlling the machine cycle only with respect to the particular machine cycles to which such sensing means are allocated.

Another and more specific object of the present invention is to simplify the set up of an automatic machine such as a machine tool, thereby to simplify the performance of different types of work on such machine tools, and another and related object is to enable electrical sensing and governing means to control automatic machines that are operated by power means that are either hydraulic or mechanical in character.

Other and further objects of the present invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claim.

For purposes of disclosure the invention has been herein illustrated as embodied in an automatic machine that constitutes an automatic turret lathe 20 having a supporting frame 21 affording an elevated bed 22 upon which the operating parts of the lathe are supported. The lathe 20 embodies a rotatable spindle 25 that is rotatably supported in a horizontal position in a mounting bracket 26 that is secured in a stationary position on the top of the bed 22, and the spindle is rotatably supported in bearings 27 and 28 carried in the mounting bracket 26. A reversible drive motor 29 is mounted by means of extensions 30 connected to the bracket 26 so as to be disposed rearwardly of the spindle 25, and a multiple V-belt drive 31 extends from a pulley 32 on the motor shaft to a pulley 33 on the spindle 25 so that when the motor 29 is operated, the spindle will be operated in a direction that is determined by the direction of rotation of the motor 29.

The spindle 25 as herein shown is hollow in character so that elongated workpieces such as closed-end cylinders W may be introduced endwise into the spindle from one end by a work feeding mechanism 35 and may be secured or clamped in a projecting relation within the other end of the spindle 25 so that the projecting end of the workpiece W may be operated upon by tools or the like carried on a tool carrying turret 40 that is disposed on the bed 22 opposite the other end of the spindle 25.

The work feeding mechanism 35 as herein shown is relatively simple, this being possible because of the fact that the workpieces W are cylindrical in character and may be moved by gravity into position in alignment with the spindle 25. Thus as will be evident in Figs. 1 and 2 of the drawings, the work feeding mechanism 35 comprises a downwardly sloping chute 36 in which the workpieces W are disposed in a transverse relation so as to tend to roll down the chute 36 and into abutment with a locating wall 37 disposed in such a position that the lowermost workpiece W will be aligned with the spindle 25. When a workpiece W is thus disposed against the abutment wall 37, it is free to move endwise out of the chute 36, it being noted that both side walls 36A of the chute are terminated in spaced relation to the abutment wall 37 so that such endwise movement of the lowermost workpiece W may be effected. For the purpose of imparting such endwise movement to the lowermost workpiece W, means are afforded for engagement with the left hand end of such workpiece as will be evident in Fig. 1 of the drawings, and in the present instance, such actuating means are in the form of a hydraulic piston and cylindrical device 38, the cylinder of which is mounted in a fixed position on a bracket 36B which also supports the work supply chute 36. The piston and cylinder device 38 has a piston 38A from which a piston rod 38B extends through one end of the cylinder, and an abutment head 39 on the end of the piston rod 38B is adapted to engage the adjacent end of the lowermost workpiece W to move the workpiece endwise out of the chute 36 and into the adjacent end of the aligned spindle 25.

Figure 2:
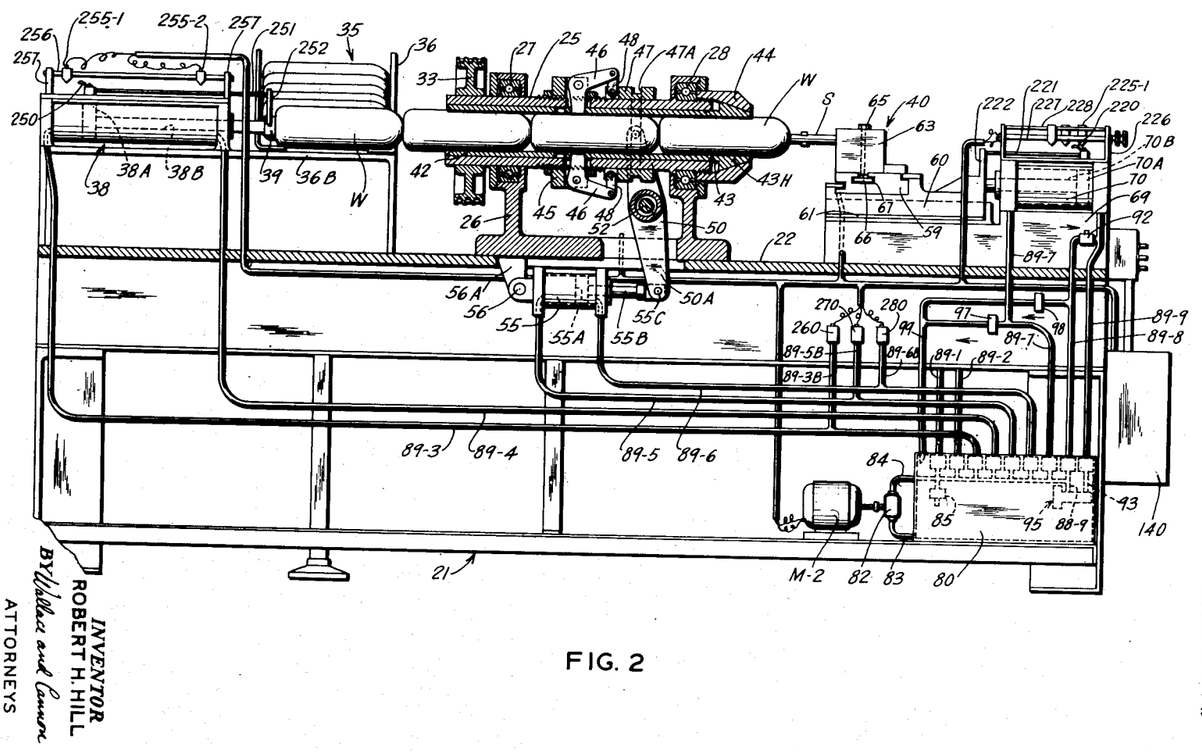
Fig. 2 is a vertical sectional view taken substantially along the line 2—2 of Fig. 1.

The workpieces W that are thus moved in succession from the lower end of the chute 36 are advanced first into a guide sleeve 42 within the adjacent end of the spindle 25, and are then advanced into a split clamping sleeve 43 that is slidably disposed within the other or right hand end of the spindle 25 as will be evident in Fig. 2. On its projecting or right hand end, the split sleeve 43 has a tapered head portion 43H that tapers to the right as viewed in Fig. 2, and this projecting head portion 43H is disposed within a cam sleeve 44 that is fixed on the spindle 25 against endwise displacement relative to the spindle. Thus when the sleeve 43 is shifted to the right, Fig. 2, the tapered head 43H engages the internally tapered sleeve 44 so as to compress the right hand ends of the tapered sleeve upon the workpiece W that is disposed within the end or heading portion 43H of the sleeve 43. The sleeve 43 thus constitutes a clamping means for securing the right hand workpiece W, Fig. 2, in the spindle 25 so that such workpiece will be rotated with the spindle and will be held against longitudinal displacement.

The work clamping means are arranged for operation by power means, and to enable this to be accomplished a hub 45 fixed on the spindle 25 has a pair of bell cranks 46 pivoted thereon so that one arm of each bell crank extends readily inwardly and is engaged with a slot in the left hand end portion, Fig. 2, of the clamping sleeve 43. When the clamping sleeve 43 is to be operated to clamp a workpiece, the bell cranks 46 are rocked so that their exposed arms are moved outwardly or away from the axis of the spindle 25, and this is effected by a slidable clamping collar 47 that is mounted for longitudinal sliding movement on the spindle 25 and which has connecting links 48 pivoted thereon and extended downwardly to pivotal connections on the outer ends of the arms or bell cranks 46. The collar 47 has an annular groove 47A formed therein, and an operating yoke 50 has rollers or studs 51 on its opposite arms that are disposed within the groove 47A. The yoke 50 is pivoted at 52 on the mounting bracket 26, and an arm 50A extends downwardly through the base of the bracket 26 for connection to power actuating means. In the present instance such power actuated means comprises a piston and cylinder device 55, and one end of the cylinder is pivoted at 56 to a downwardly projecting lug 56A formed on the base of the bracket 26 and extending downwardly through a slot in the bed 22. The piston and cylinder device 55 has a piston 55A from which a piston rod 55B extends through the opposite end of the cylinder, and the end of the piston 55B is connected at 55C to the lower end of the arm 50A. Thus when the clamping sleeve 43 is to be operated to clamp a workpiece W, the piston 55A is forced to the right to the position shown in Fig. 2, while to release a workpiece W, the piston 55A is forced to the left from the position shown in Fig. 2, and it will be observed that in a clamping movement the links 48 are moved into positions substantially at right angles to the axis of the spindle so as to hold the parts in work clamping relation until the sleeve 47 is again moved to the right.

The workpiece W that is clamped in a projecting relation adjacent the right hand spindle 25 is adapted to be operated by a plurality of tools T–1, T–2 and T–3 that are mounted on the turret or slide 40 for shifting movement selectively into alignment with the workpiece W. Such selective setting of the tools is accomplished by transverse shifting movement of the turret or cross slide 40 and for this purpose, the cross slide is mounted on transverse ways 59 that are afforded upon a longitudinally reciprocable carriage 60. The carriage 60 is in turn mounted for longitudinal reciprocation parallel to the axis of the spindle 25 on supporting and guiding ways 61, and the transverse shifting movements of the cross slide 40 are accomplished when the carriage 60 is in a withdrawn or right hand position as viewed in Figs. 1 and 2 of the drawing. As herein shown the several tools T–1, T–2 and T–3 are supported on individual mounting blocks 63 which are secured in place on the slide 40 by means including clamping bolts 65, and nuts 66 that are disposed in an undercut T-slot 67 formed in the cross slide parallel to its path of reciprocating movement. The turret or cross slide 40 also carries a stop bar S which is similarly mounted in a mounting block 63 as will be evident in Figs. 1 and 2, and the stop bar S is arranged in one position of the slide 40 to be aligned with the axis of the spindle 25, and with this arrangement, the stop bar S acts as an abutment against which the leading one of a series of workpieces W may be moved in the course of the advancing movement of the work feeding plunger 39. This serves to accurately position the workpiece in a longitudinal sense with respect to the spindle as well as the bed and other elements of the machine.

The ways 61 upon which the carriage 60 is slidably supported are formed on a mounting casting 69 that is secured to the bed 22 near the right hand end thereof, and means are afforded upon the casting 69 for imparting longitudinal movements to the carriage 60. In the form herein illustrated, such actuating means take the form of a cylinder 70 having a piston 70A reciprocable therein. The cylinder 70 is mounted in a fixed position on the casting 69 and a piston rod 70B extends from the piston 70A through the left hand end of the cylinder 70 and is connected to the carriage 60 so that by operation of the piston and cylinder device, the carriage 60 may be reciprocated toward and away from the workpiece W.

The cross slide 40 is also arranged to be reciprocated by the power means and as herein shown such power means are afforded by a hydraulic cylinder 75 that is mounted on a rigid rearward extension 76 that is fixed on the carriage 60. The cylinder 75 has a piston 75A that is reciprocable therein, and a piston rod 75B is extended forwardly from the piston 75A and is connected at its forward end to the slide 40. Thus by operation of the piston and cylinder device 75, the slide 40 may be reciprocated to dispose the stop S or any selected one of the tools T in alignment with the spindle 25.

The hydraulic system that is utilized for supplying hydraulic fluid to the several piston and cylinder devices hereinbefore described includes a tank 80 that is disposed on the frame 21 of the machine near the floor and below the location at which the carriage 60 is disposed, and the frame 21 also carries a motor M–2 which drives a pressure pump 82. The pump 82 is connected by an inlet pipe 83 to the tank 80 adjacent the bottom wall thereof, and the high pressure output of the pump 82 is discharged to an outlet pipe 84 which extends through one end of the tank 80 and longitudinally within the upper portion of the tank 80 so as to constitute a pressure header from which high pressure hydraulic liquid may be withdrawn as required. The header has a pressure relief valve 85 associated therewith in a conventional manner so that excess hydraulic liquid supplied by the pump 82 will be discharged back into the tank 80.

The hydraulic liquid under pressure is withdrawn from the pressure header 84 and is transmitted to any selected one of the hydraulic cylinders under control of a plurality of similar solenoid operated valves 86–1 to 86–9, each such solenoid operated valve 86 having an actuating coil 87 which when energized serves to open the valve so as to allow high pressure hydraulic liquid to pass through the pipe in which such valve is disposed. Thus with respect to the solenoid operated valve 86–1, it may be observed that an inlet pipe 88–1 is connected to the pressure header 84 from the inlet end of the valve 86–1, while an outlet pipe 89–1 is extended from the outlet side of the valve 86–1 to the forward end of the cylinder 75. When the solenoid valve 86–1 is operated due to energization of its coil 87–1, pressure liquid is allowed to pass from the header 84 to the forward end of the cylinder 75 which is the cylinder that serves to reciprocate the slide 40, thereby to cause rearward movement of the slide 40. When however the valve 86–1 is allowed to close, the pipe 89–1 is placed in communication with a discharge outlet 90–1 so that the liquid from the forward end of the cylinder 75 may be discharged back into the tank 80. All of the valves 86 have similar discharge or return connections 90.

The valve 86–2 is similarly connected on its inlet side to the header 84 by an inlet pipe 88–2, while an outlet pipe 89–2 extends from the outlet side of this valve to the rear end of the cylinder 75 so that when the valve 86–2 is opened, the turret or slide 40 will be moved in a forward direction.

The valve 86–3 is connected by a pipe 88–3 to the header 84, while a pipe 89–3 extends from the other side of the valve 86–3 to the left hand end of the work feeding cylinder 38 so that when the valve 86–3 is opened, the work advancing plunger 39 will be moved in a right hand or work advancing direction. The valve 86–4 has its inlet side connected by a pipe 88–4 to the header 84, and a pipe 89–4 extends from the other side of the valve 86–4 to the right hand end of the cylinder 38 so that when the valve 86–4 is opened, the work advancing plunger 39 will be moved to the left in a return direction. The valve 86–5 is similarly connected by a pipe 88–5 to the pressure header 84, and a pipe 89–5 connects the other side of this valve to the left hand end of the cylinder 55 so that when the valve 86–5 is opened, the jaws of the spindle 25 will be clamped so as to fix the leading workpiece W in position on the spindle. The valve 86–6 is connected by a pipe 88–6 to the header 84, and a pipe 89–6 connects the other side of this valve to the right hand end of the cylinder 85, and hence when the valve 86–6 is opened, the work clamping jaws of the spindle 25 will be released. The valve 86–7 is connected by a pipe 88–7 to the pressure header 84 and a pipe 89–7 connects the other end of the valve 86–7 to the left hand end of the cylinder 70, and hence when the valve 86–7 is opened the carriage 60 will be moved to the right or in a return direction. A pipe 88–8 connects the header 84 to the inlet of the valve 86–8, while a pipe 89–8 connects the output of the valve 86–8 to a conduit 89–9 which is connected with the right hand end of the cylinder 70. The pipe 89–8 includes a check valve 92 which allows pressure liquid to flow in the direction indicated by the arrow in Fig. 11A from the valve 86–8 to the pipe or conduit 89–9, and the function of this check valve 92 will be explained in greater detail hereinafter. The pipe 89–9 is connected to the output side of the solenoid operated valve 86–9, while the inlet side of the valve 86–9 is connected by a pipe 93 with the outlet side of a rate-control valve 95, the inlet side of which is connected by pipe 88–9 to the header 84.

Figure 11:
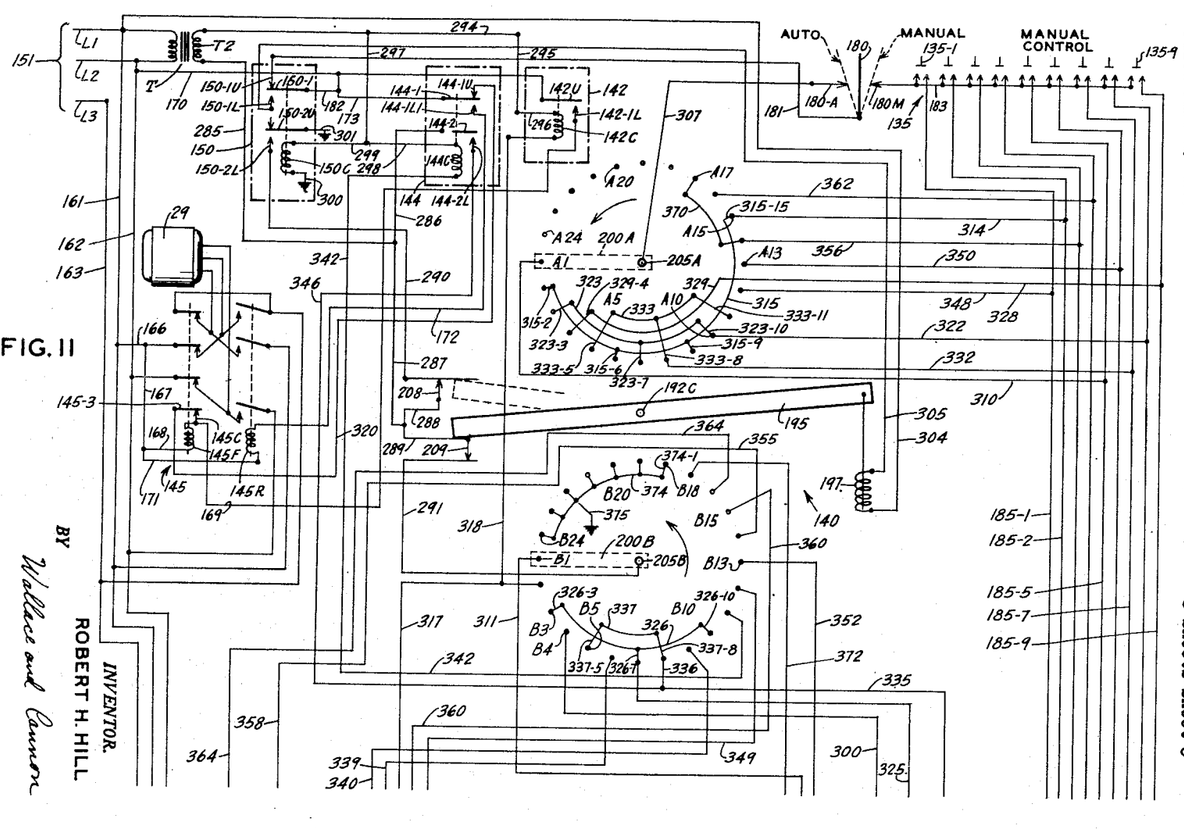
Figs. 11 and 11A are views, which and when taken together, constitute a schematic wiring diagram of the control mechanism of the present invention.
Figure 11A:
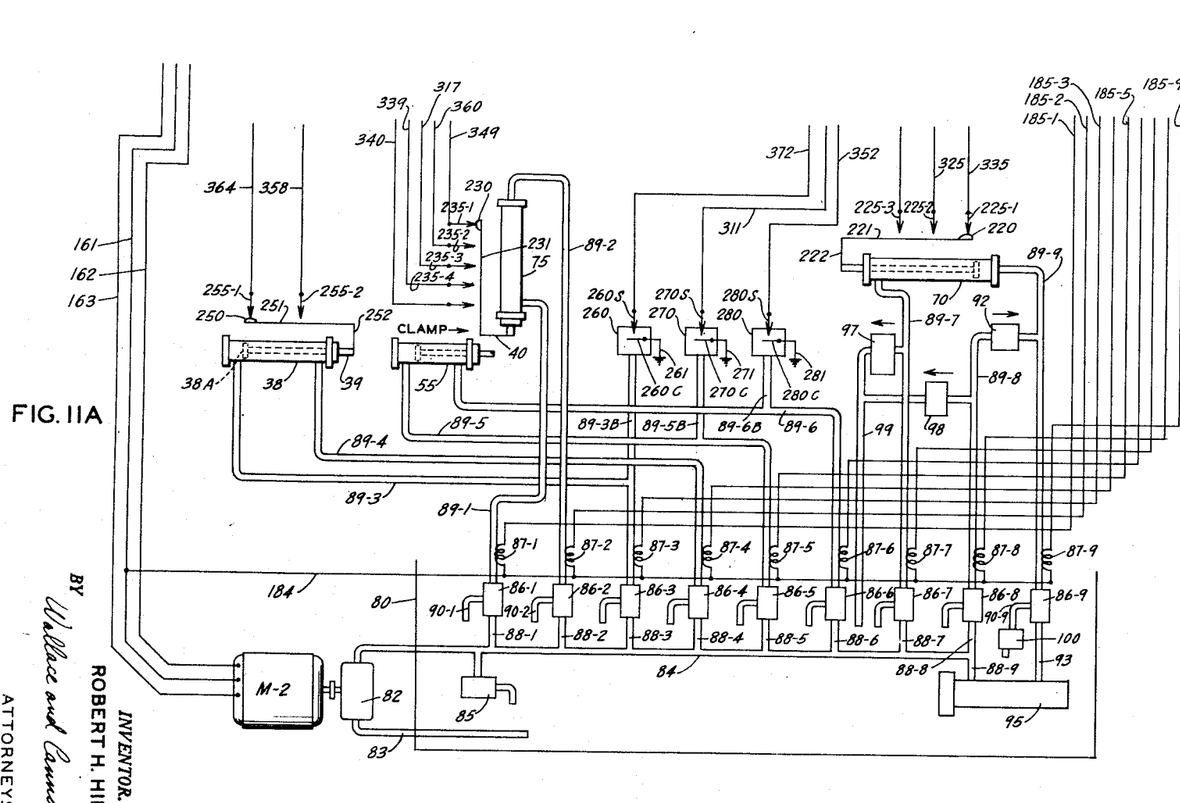

When the carriage 60 is being operated in some conditions, it is desirable to limit the pressure or force that may be applied thereto, and for this reason the pipes 89–7 and 89–8 have low pressure relief valves 97 and 98 associated respectively therewith, and the outlet sides of the relief valves 97 and 98 are connected with a return pipe 99 so that hydraulic liquid that is passed through either of these valves 97 or 98 will be returned to the tank 80 as indicated in Fig. 11A of the drawings.

Since hydraulic liquid is passed through the check valve 92 to the pipe 89–9 at times when the valve 86–9 is in its normal position, the return outlet 90–9 of this valve has a low pressure relief valve 100 associated therewith so that during rapid approach movement of the carriage 60, hydraulic liquid will not be lost through the return 90–9. The check valve 92 serves of course to prevent loss of high pressure liquid that is furnished to the pipe 89–9 through the valve 89–9 and the rate control valve 95.

Figures 3, 4, 5:
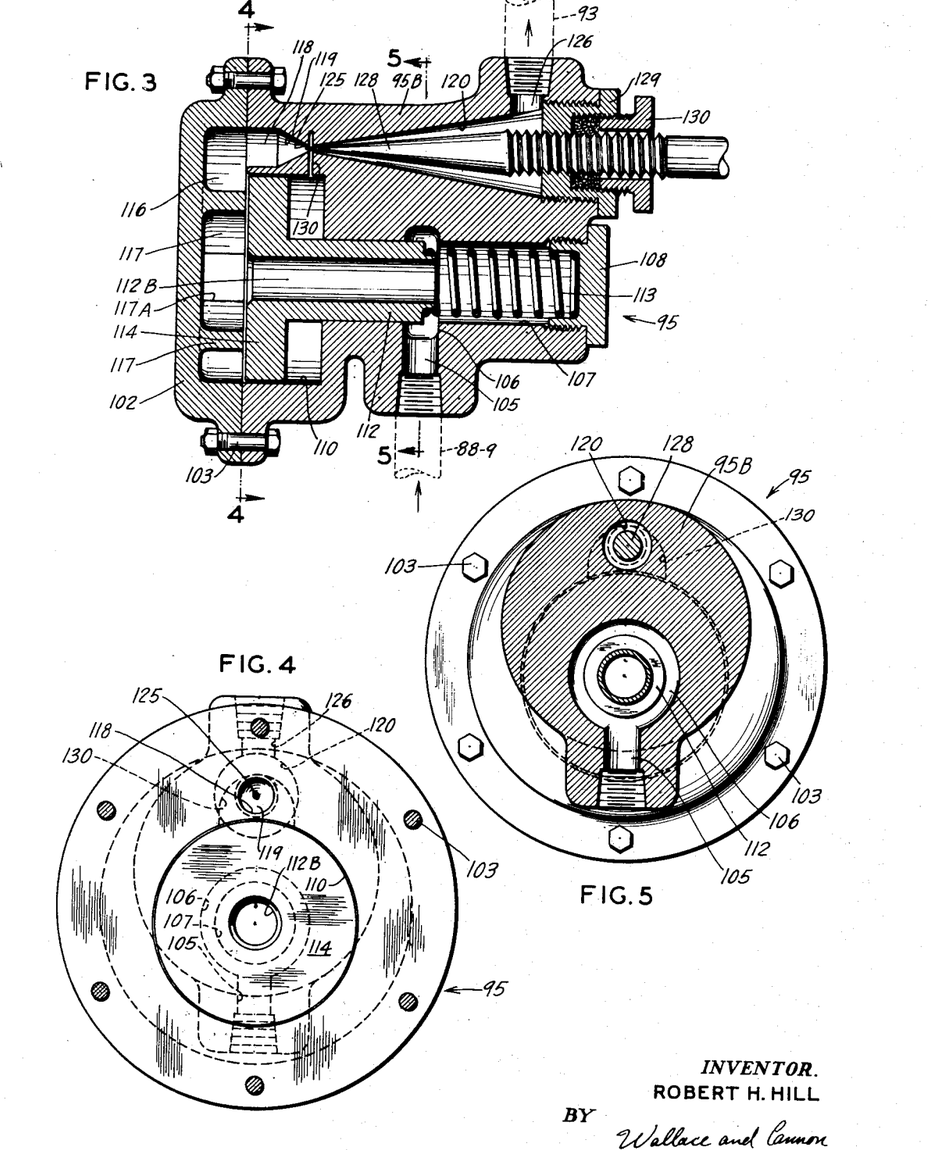
Fig. 3 is a vertical sectional view taken through a rate control valve embodying certain features of the present invention.
Fig. 4 is a vertical sectional view taken substantially along the line 4—4 of Fig. 3.
Fig. 5 is a vertical sectional view taken substantially along the line 5—5 of Fig. 3.

The rate control valve 95 as constructed under the present invention is arranged so that the desired rate of supply of hydraulic liquid through this valve is substantially independent of the viscosity of the liquid, and the structure whereby this advantageous result is attained is illustrated in detail in Figs. 3 to 5 of the drawings. Thus the rate control valve 95 has a valve body 95B that is formed as a casting, and a flanged end cap 102 is secured upon the left hand end of the valve body as viewed in Fig. 3 by means including clamping bolts 103 that extend through suitable flanges formed on the body 95B and the cap 102. The inlet pipe 88–9 is threaded into an inlet passage 105 that is formed transversely into the body 95B, and this inlet passage 105 terminates in an annular distributing passage 106 that is formed about and concentric with a guide bore 107 which intersects with the inlet passage 105. The guide bore 107 is closed at its right hand end, Fig. 3, by a cap 108, while at its left hand end this bore 107 opens into an enlarged cylindrical chamber 110 that is formed as a counter bore into the left hand end of the valve body 95B, the chamber 110 being concentric with the guide bore 107. Within the guide bore 107, an elongated tubular valve member 112 is mounted for sliding movement so as to act as a valve member for governing the effective valve opening that is afforded between the inlet passage 105 and the bore 112B of the valve member 112. Thus as will be evident in Fig. 3 of the drawings, a spring 113 is mounted between the cap 108 and adjacent right hand end of the valve member 112 tending to move the valve member in a left hand or valve opening direction. When the valve member 112 is moved to the right against the action of the spring 113, the outer annular edge of the right hand end of the valve member approaches the edge defined by the intersection of the bore 107 with the right hand edge of the annular chamber 106 and thus the effective opening through which liquid may flow from the annular chamber 106 into the bore 107 is reduced in such movement of the valve member.

The valve member 112 is automatically actuated in response to measurment of the flow through the valve 95, and in accomplishing such automatic actuation of the valve member 112, a piston 114 is afforded on the left hand end of the valve member so as to be disposed within the chamber 110. The liquid from the bore 107 passes through the central bore 112B of the valve member and enters into a recessed chamber 116 formed in the inner face of the end cap 102, and this chamber 116 has a plurality of arcuate walls 117 formed therein which limit the left hand or opening movement of the valve member 112, such limiting action being obtained by abutment of the piston 114 with the stops or abutments 117. The liquid that flows through the passage 112B and into the chamber 116 passes through spaces 117A between abutments 117 and then flows to metering means which are effective to control and adjust the valve member 112. In affording such metering means, a passage 118 is extended from the chamber 116 as a bore through the left hand face of the body 95B, and this bore 118 terminates in a conical inner end portion 119. In alignment with the bore 118, a conical bore 120 is extended inwardly from the right hand end of the body 95B, and this bore 120 meets the conical bore 119 in such a way as to define a venturi affording a relatively short and small metering orifice 125. Thus the liquid will flow from the chamber 116 through the bores 118 and 119 and the metering orifice 125, and will then pass through the passage 120 which leads to an outlet opening 126 to which the outlet pipe 93 is connected. Since it is desirable that the orifice 125 be adjustable in so far as its effective area may be concerned, a tapered metering pin 128 is extended axially into position within the conical bore 120, and for this purpose a mounting fitting 129 and a packing gland 130 are associated with the metering pin 128 at the outer or right hand end thereof as viewed in Fig. 3. The metering pin 128 has a screw threaded engagement with the fitting 129 so as to be axially adjustable for varying the effective area of the orifice or restriction 125.

The pressure on the inlet side of the orifice 125 is of course applied to the left hand end of the piston 114 through the chamber 116, while the pressure at the other or outlet side of the orifice 125 is applied to the right hand face of the piston 114. Such application of the lower pressure to the right hand side or face of the piston 114 is accomplished by a passage 130 which is formed as a milled slot or saw kerf extended from the chamber 110 so as to intersect the tapered bore 120 just to the right of its point of intersection with the tapered bore 119, or in other words, just to the right of the restriction or throat 125.

With the structure that is thus afforded in the rate control valve 95, the rate of flow through the valve is rendered substantially independent of the viscosity of the liquid. This result is based upon the fact that the velocity of a liquid through a properly designed nozzle is a function of the pressure drop across the discharge orifice of the nozzle, and upon the further fact that if the nozzle is short, the velocity of the flow is practically independent of the viscosity of the fluid. Thus it will be observed that the location of the passage 130 in such a way as to measure the low pressure almost exactly at the throat 125 between the two passages 119 and 120 affords a pressure differential measurement that is substantially independent of the viscosity of the liquid, and hence the aforesaid accuracy of control valve 112 is attained. This result is attained without objectionable pressure loss, since the tapered passage 120 results in recovery of substantially the entire pressure drop which is experienced across the throat 125.

Figure 1:
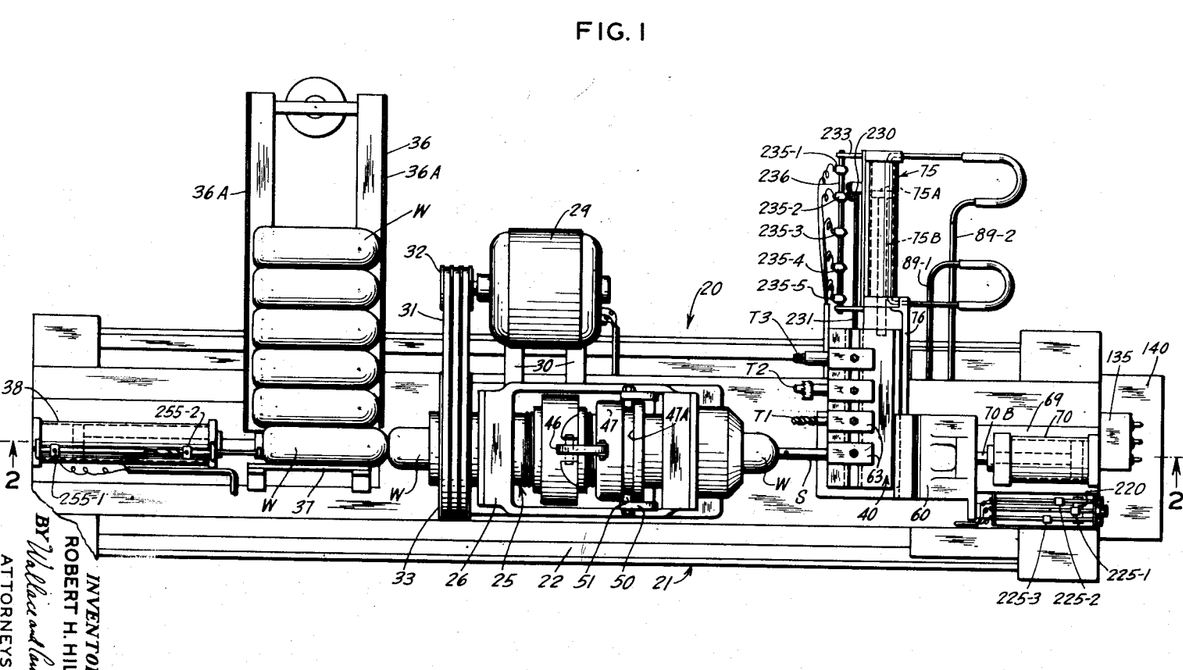
Fig. 1 is a plan view of an automatic turret lathe embodying the features of the present invention.

The power actuating means that are thus afforded for the various operating mechanisms of the machine may be controlled manually through a manual control switch mechanism 135, or may be controlled automatically through the use of automatic control mechanism that is housed within a control casing 140 disposed at the right hand end of the machine frame 21 as viewed in Figs. 1 and 2 of the drawings. The automatic control of the machine is attained through the cooperative action of a main sequence control 140 that is shown in detail in Figs. 6 to 10 and a plurality of interrelated relays that are illustrated in Fig. 11 of the drawings. Thus a starting relay 142 and a reversing relay 144 are provided for governing the main drive motor 29, and these relays act through the medium of a starting contactor 145 which may be actuated to cause the motor 29 to operate in either forward or reverse directions. A stepping relay 150 is also provided for cooperation with the other mechanism in attaining the desired automatic operation of the machine.

The motors 29 and M-2 are three phase motors that are energized from a three phase power source 151, this power source affording line wires L1, L2 and L3. The line wires L1, L2 and L3 are connected directly to the motor M-2 so that this motor of the hydraulic system is constantly driven so long as power is supplied from the source 151. Thus wires 161, 162 and 163 are extended respectively from the line wires L1, L2 and L3 to the motor M-2, and branch leads are conventionally extended from the wires 161, 162 and 163 to the contactor 145 for energizing the drive motor 29. The contactor 145 has a pair of operating coils 145F and 145R which when energized serve to establish connections in either forward or reverse directions for the motor 29 and the operation of such reversing contactor mechanism 145 per se is of course conventional in character. The coil 145F is connected by wires 166, 167 and 168 to the wire 161 which extends from the line wire L1, while a wire 169 extends from the other end of the coil 145F to the stationary contact 142-1L of the starting relay 142. The other or movable contact 142-1 of the relay 142 is connected by the wire 170 to the wire 162 which is in turn connected to the line wire L2, and hence when the relay 142 is energized, the coil 145F of the contactor 145 will be energized and the motor 29 will be driven in a forward direction. Similarly, a wire 171 extends from the wire 167 to one end of the coil 145R, while a wire 172 extends to a lower contact 144-1L of the reversing relay 144. The related movable contact 144-1 is connected by a wire 173 to a wire 170 so that when the relay 144 is energized, the operating coil 145R of the contactor will be energized so as to cause the motor 29 to be driven in a reverse direction.

The reversing relay 144 has an operating coil 144C, and has an upper contact 144-1U that is normally closed or engaged with the contact 144-1, and this relay also has a second movable contact 144-2 which is normally spaced from a lower contact 144-2L, and the function of these additional contacts will be explained in detail hereinafter. The stepping relay 150 has an operating coil 150C, and also has movable contacts 150-1 and 15-U and the contact 15-U is adapted to be engaged with a lower stationary contact 150-2L when the operating coil 150C is energized. The contact 150-1 is normally engaged with an upper stationary contact 150-1U, but when the coil 150C is energized, the contact 150-1 is engaged with a lower contact 150-1L. The connections and functions of these additional contacts will be described in detail hereinafter.

The manual control switch mechanism 135 is adapted to be rendered effective by the control switch 180 which is shiftable into engagement selectively with a contact 180A or a contact 180M, and the contact 180 is connected by a wire 181 to the contact 150-1U, the movable contact 150-1 being connected by a wire 182 to the wire 173, thus to establish connection through the wires 170 and 162 to the line wire L2. When the machine is to be controlled manually by the switch mechanism 135, the switch arm 180 is shifted into contact with the contact 180M, and the contact 180M is connected in parallel by a wire 183 to one contact of each of nine push button switches that are identified in Fig. 11 as switches 135-1 to 135-9.

The push button switches 135-1 to 135-9 are allocated respectively to the control of the solenoid valves 86-1 to 86-9, and in this respect, it should be observed that the other side of the circuit is connected with one terminal of each of the operating coils 87-1 to 87-9 by a wire 184 extended from the wire 161 as shown in Fig. 11A of the drawings. The other terminals of the coils 87-1 to 87-9 are connected by wires 185-1 to 185-9 with the other contacts of the respective switches 135-1 to 135-9. Hence by closure of any selected one of the switches 135, the related operating coil 87 may be energized thereby to open the related valve 86, and when this is done, hydraulic liquid will be furnished in the desired way to the related one of operating mechanisms of the machine.

In accordance with the present invention, means are associated with each of the operative mechanisms of the machine for sensing the completion of the desired operation or cycle thereof or for sensing any critical positioning or point in the cycle thereof at which a controlling action is desired, and the control unit 140 and the relays 142, 144 and 150 cooperate in attaining the desired sequence or relation of operations of the several operative mechanisms of the machine. Considered broadly, the control unit 140 and the stepping relay 150 cooperate in such a way as to enable operations of the means or mechanism of the machine to be stopped immediately by the proper or related sensing means, while at the same time such sensing means are effective to reset the control unit 140 to initiate the operation of the operative mechanism that is to be next effective and to condition the related sensing means that are to be effective to terminate such succeeding operation.

Figures 6, 7, 8, 9, 10:
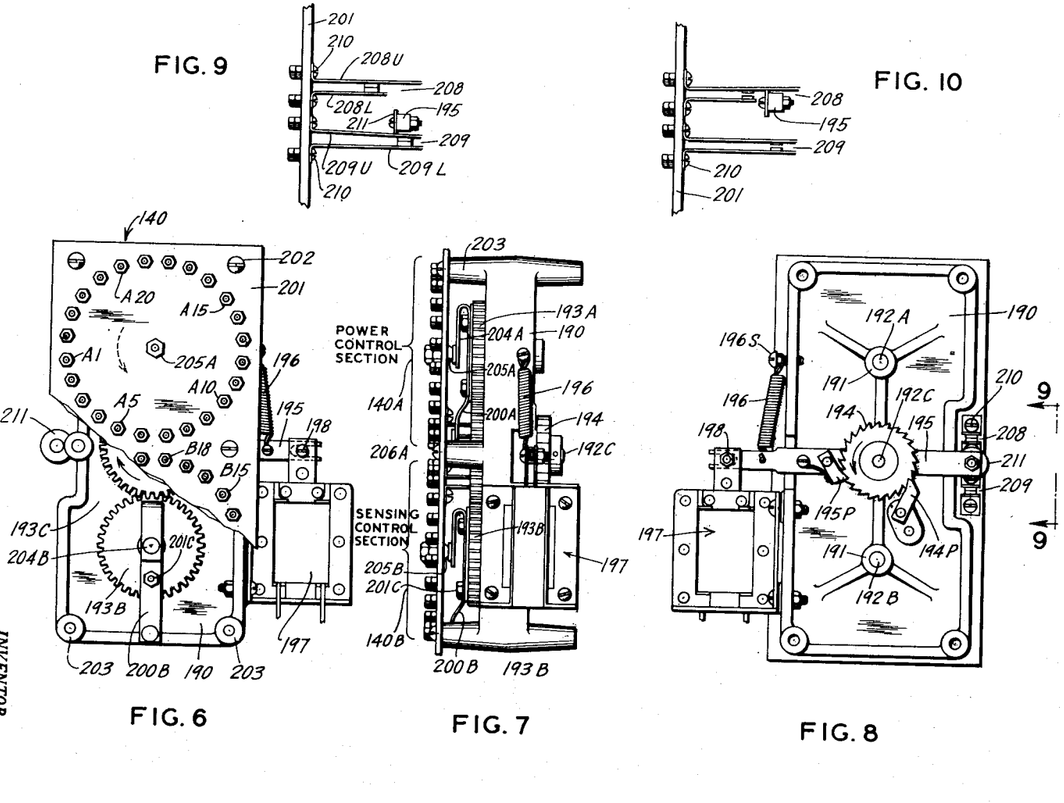
Fig. 6 is an end elevational view of an electrical control switching mechanism embodied in the control mechanism of the present invention.
Fig. 7 is an end elevational view showing the right hand end of the mechanism shown in Fig. 6.
Fig. 8 is a rear elevational view of the mechanism shown in Figs. 6 and 7.
Figs. 9 and 10 are fragmental views taken substantially along the line 9—9 of Fig. 8 and illustrating certain of the switch members in different relationship.

In attaining such controlling action, the control unit 140 is provided with a power control section 140A and a sensing control section 140B, Figs. 7 and 11, and in the form herein shown, the control mechanism is in the form of a stepping switch so that the power control section 140A and the sensing control section 140B constitute electrically independent switching sections that are mechanically interrelated so that concurrent setting movements of the two sections may be attained. The unit 140 as shown in detail in Figs. 6 to 10 comprises an elongated casting 190 that is arranged to afford three parallel but vertically spaced bearing sleeves 191, the middle one of these bearing sleeves being concealed behind other elements as illustrated in the drawings. A shaft 192A disposed in the upper one of the bearing sleeves is arranged to support a gear 193A on the left hand face of the bearing casting as viewed in Fig. 7, while a stub shaft 192B in the lower one of the three bearing sleeves is arranged to support a gear 193B of the same size on the left hand face of the bearing casting, and between the two gears 193A and 193B a shaft 192C supports an intermediate drive gear 193C which is meshed with the two gears 193A and 193B. On the right hand end of the shaft 192C, a ratchet wheel 194 is secured so that by actuation of the ratchet wheel 194, the drive gear 193C may be rotated in a clockwise direction, Fig. 6, thereby to rotate the two gears 193A and 193B in unison and both in a counterclockwise direction, Fig. 6. In attaining such actuation of the shaft 192C, a rocking lever 195 is pivoted on the shaft 192C and is urged in a clockwise direction, Fig. 8, to a home position by a spring 196 which acts between the lever 195 and an anchoring screw 196S fixed on the casting 190. A spring pressed pawl 196P is mounted on the rocking lever 195P, and when the rocking lever 195 is rocked in a counterclockwise direction, Fig. 8, against the action of its spring 196, the pawl 195P acts on the ratchet wheel 194 to impart an advancing or indexing movement to the shaft 192C, and a spring pressed pawl 194P mounted on the casting 190 serves to hold the ratchet wheel 194 against reverse or clockwise movement as viewed in Fig. 8.

The rocking lever 195 is actuated by a solenoid 197 that is mounted on one edge of the bearing casting 190, and a pin and slot connection 198 is afforded between the armature of the solenoid 197 and the adjacent or left hand end of the rocking bar 195 as viewed in Fig. 8 of the drawings.

The gears 193A and 193B serve respectively to support movable switch arms 200A and 200B, which are connected to such gears by cap screws 201C, and it is through the selective setting of these switch arms in unison that the desired controlling action is attained. Thus it will be observed that an insulating contact supporting plate 201 is secured by screws 202 on mounting lugs 203 that are afforded on the mounting casting 190, and this plate is supported opposite and in spaced relation to the two gears 193A and 193B. The switch arm 200A has one end thereof disposed so as to be coaxial with the shaft 192A, and a contact 204A on this arm is arranged to yieldingly engage a center contact 205A that is mounted on the insulating plate 201. The other end of the switch arm 200A has a contact 206A formed thereon which is adapted in the rotative movement of the gear 193A to be engaged successively with an annular series of contacts that are shown in Figs. 6, 7 and 11, such series of contacts being mounted on the insulating plate 201 concentric with the axis of the gear 193A and being identified as contacts A1 to A24 inclusive. With respect to the switch arm 200B, a similar central contact 205B is afforded on the insulating plate 201, and an annular series of contacts B1 to B24 are also provided on the insulating plate 201 so that in the course of rotation of the gear 193B, the circuit will be extended from the central contact 205B successively to the contacts B1 to B24.

In the operation of the stepping switch or control unit 140, the desired timing and full stroke action is attained in this unit through the use of a pair of switches 208 and 209 which are arranged to be operated by the rocking arm 195. Thus the switch 208 has the spring contact arms 208U and 208L thereof secured on the insulating plate 201 by screws 210, and the upper blade 208U of this switch is extended so as to lie over and in the path of an insulating block 211 that is secured on the right hand end of the arm 195 as viewed in Fig. 8. The other or lower switch 209 is of the normally open type and has upper and lower blades 209U and 209L thereof secured in position on the insulating plate 201 by similar screws 210, and this switch 209 is so disposed that the upper blade thereof lies in the path of the lower edge of the insulating block 211. Thus when the spring 196 shifts the arm 295 to its rest position, the switch 209 will be closed, while at this same time the switch 208 will also be closed. When the solenoid 197 is energized so as to impart stepping or indexing movement to the switch elements, the initial movement of the arm 195 will allow the switch 209 to open, while at the end of the switch advancing stroke of the arm 195, the switch 208 will be opened. When the solenoid 197 is deenergized so as to allow the rocking arm 195 to return to its rest position, the switch 208 will first be allowed to close, and when the rocking arm 195 reaches its rest position, the switch 209 will also be closed. This sequence of opening and closing movements of the switches 208 and 209 is utilized in obtaining a desired controlling action of the present structure.

In associating the control mechanism with the machine, sensing means are afforded with respect to each of the elements that are operated or moved so that the attainment of a certain position or condition in such elements or operative mechanisms may be sensed. Thus with respect to the carriage 60, a moving contact 220 is supported on the carriage by means of a supporting rod 221 which is fixed at its left hand end to an upstanding arm 222 that is mounted on the carriage 60. The contact 220 is arranged in the movement of the carriage 60 to be engaged with a plurality of adjustable sensing contacts 225-1, 225-2, 225-3, and these adjustable contacts are supported in a bracket 226 by means of supporting rods 227 and adjusting screw shafts 228 so that these contacts may be adjusted longitudinally of the path of movement of the carriage 60. It will be evident in Fig. 1 of the drawings that the several contacts 225 are spaced laterally from each other, and this affords the desired clearance so that these contacts may be readily adjusted, and the contact 220 is relatively wide as shown in Fig. 1 so that it may engage any one of the contacts 225.

With respect to the cross slide or turret 40, a similar movable contact 230 is mounted on an arm 231 which in turn is supported by a connection at one end thereof on the rear end of the cross slide 40. The contact 230 is adapted for cooperation with a plurality of adjustable sensing contacts 235-1, 235-2, 235-3, 235-4 and 235-5, and in respect to this set of sensing contacts, it will be observed that all such contacts are mounted on a single supporting bar 236 that is extended between supporting brackets 237 mounted on the cylinder 75 and are held in adjusted position on the rod by suitable set screws. Thus in the course of the longitudinal movement of the cross slide 40, the contact 230 will be engaged successively with the several sensing contacts 235, and these contacts 235 are set along the bar 236 so as to correspond with the locations of the tools on the cross slide 40.

The work loading or feeding cylinder 38 also has a movable contact 250 mounted thereon by means of a longitudinally extending rod 251 which is in turn supported on the work engaging plunger 39 by a bracket 252. In the course of the longitudinal movements of the piston 38A, the contact 250 is arranged to engage adjustable sensing contacts 255-1 and 255-2 in succession, and these contacts are supported upon a longitudinal bar 256 so as to be adjustable longitudinally thereon. The bar 256 is supported in brackets 257 which are mounted on the top of the cylinder 38.

The sensing means as thus described are in each instance in the nature of switches having one stationary contact and another contact movable with the movable element of the mechanism with which they are associated, but it will be recognized that different kinds of sensing means may be afforded. Thus with respect to the work feeding means, it has been pointed out that the forward stroke of the work feeding means brings the leading end of the leading workpiece W into abutment with the stop S, and to sense this condition, means are afforded that are responsive to an increase of pressure in the rear or left hand end of the cylinder 38 when the movement of the work feeding plunger 39 is stopped. Thus as shown in Fig. 11A of the drawings, the pipe 89-3 has a branch 89-3B connected thereto, and this branch is connected to a pressure operated switch 260. The switch 260 has a movable contact 260C that is grounded at 261 and it also has a stationary contact 260S. The switch 260 is normally opened, and is closed when an abnormal pressure is built up in the pipe 89-3.

The completion of the movements of the work clamping piston 55A are in each instance detected by pressure operated switches. Thus a pressure operated switch 270 having a stationary contact 270S and the movable contact 270C is connected by a pipe 89-5B to the pipe 89-5. The switch 270 has the contact 270C thereof grounded at 271 and this switch is normally opened and is arranged to be closed by abnormal pressure in the pipe 89-5. A similar switch 280 having a stationary contact 280S and the movable contact 280C is connected by a pipe 89-6B to the pipe 89-6, and the contact 280C is grounded at 281. The switch 280 is also of the normally open type and is arranged to be closed when an abnormal pressure is present in the pipe 89-6.

In affording the desired actuating and control connections, it will be observed that certain of such connections are permanent in character, while others are established in accordance with the desired cycle of operation of the machine.

The electrical power for such connections is afforded primarily from a transformer T, the primary of which is connected across the line wires L1 and L2. The secondary T-2 of this transformer has a wire 285 extended from one terminal thereof, and a wire 286 in series with the wire 285 is extended to the movable contact 144-2 of the reversing relay 144. Another wire 287 is extended from the wire 285 to a pair of branch leads 288 and 289 which extend respectively to one contact of each of the switches 208 and 209. A wire 290 extends from the other contact of the switch 208 to the contact 150-2L of the stepping relay 150, while a wire 291 extends from the other contact of the switch 290 to the contact 205B of the sensing control section 140B of the stepping relay 140.

A wire 294 is extended from the other terminal of the secondary T-2, and wires 295 and 296 are extended in series from the wire 294 to one terminal of the coil 142C of the relay. A wire 297 is extended from the wire 294 and has branch leads 298 and 299 extended respectively to the coils 144C and 150C.

The other end of the coil 150C is grounded at 300, while the contact 150-2U is grounded at 301, but it will be observed that the other terminals of the coils 142C and 144C are connected selectively to different stations on the control mechanism 140 in accordance with the cycle of machine operation that is desired, and this will be described in further detail hereinafter. The operating coil of the solenoid 197 is actuated or energized under the control of the stepping relay 150, and a wire 304 is extended from the line wire L1 to one terminal of the solenoid 197. A wire 305 is in turn extended from the other terminal of the solenoid 197 to the contact 150-1L of the stepping relay 150. Another permanent connection that is employed is afforded by a wire 307 that extends from the contact 180A to the contact 205A so that when the switch 180 is engaged with the contact 180A, current will be supplied to the contact 205A. It will be observed that the several pressure switches 260, 270 and 280 are in each instance grounded from one contact thereof, and similar grounded connections are afforded for the contacts 220, 230 and 250, but such grounded connections are through the machine frame and have not been specifically indicated in Fig. 11 of the drawings.

With the structure that has thus been described, the various operating mechanisms of the machine may be automatically operated in the desired sequence and to the desired extent merely through establishment of selective connections between the various sensing elements and the sensing control section 140B of the stepping relay, and by the establishment of related connections between the power control section 140A of the stepped relay and the power control valves 86. Broadly considered, such automatic action or operation of the machine is attained by analyzing the cycle of operations that is desired with respect to the various operating mechanisms of the machine. Such analysis of the cycle of operations of the machine may of course start at any point in the cycle, and for illustrative purposes, the analysis of a particular cycle of the machine herein illustrated will be started with the leading workpiece disposed in position in the spindle 25, as shown in Fig. 2, but with the work clamping jaws 43H in their released relation. As a further element in such analysis, it must be assumed that the previous operation of the machine will have caused the stepping switch 140 to have been operated so as to dispose the arms 200A and 200B thereof in the position shown in Fig. 11 of the drawings.

When the work is in the position shown in Fig. 1 with the leading end thereof in contact with the stop S, it is necessary to operate the clamping means of the spindle 25 and for this purpose, a wire 310 is extended from the contact A–1 of the power control section 140A to the wire 185–5, thereby to afford an energizing circuit for the solenoid valve 86–5. This valve 86–5 is therefore opened and hydraulic fluid is fed to the left hand end of the clamping cylinder 55. The clamps are thereby engaged with the workpiece, and when the clamping movement has been completed, the pressure increase in the pipe 89–5 will cause the pressure switch 270 to be closed. In order that the pressure switch 270 may under such circumstances be effective to cause the next machine operation to be instituted, a wire 311 is extended from the contact B–1 of the stepping switch so that a sensing circuit is conditioned through the contact B–1 to the switch 270 at the time when the clamping operation is initiated.

Considering more specifically the action of the various elements in initiating and terminating the operation of the work clamping mechanism, it should be observed that the energizing circuit for the power control side or section 140A of the control mechanism is extended from the line wire L2 through the wire 170, the wire 182, the contact 150–1, the contact 150–1U and the wire 181 to the switch 180, while the circuit is extended from the switch 180 through the wire 307, the contact 205A, the switch arm 200A, the contact A1, and the wires 310 and 185–5 to one terminal of the relay coil 87–5, and the other side of the circuit is extended through the wire 184 and the wire 161 to the line wire L1. Thus the energizing circuit for the solenoid valve 86–5 extends not only through the contact A1, but also through the contact 150–1U of the stepping relay 150 so that such circuit will be immediately broken when the stepping relay 150 is energized. With this arrangement, the subsequent stepping movement of the contact arms of the stepping relay 140 takes place while there is no current flow through the contacts of the stepping switch.

The circuit to the sensing switch 270 is of course grounded at 271, and this circuit extends through the wire 311 and the contacts B1 and 205B to the wire 291. The wire 291 is of course connected to the switch 209 which at this time is closed, and the circuit extends from the switch 209 through the wires 289, 287 and 285 to one side of the secondary T–2. Insofar as the relay 150 is concerned, the circuit from the other side of the secondary T–2 is extended by the wires 294, 297 and 299 to one terminal of the operating coil 150C of this relay, and the other side or terminal of the operating coil is grounded. Thus when the sensing switch 270 is closed, the stepping relay 150 will be energized and such operation of the relay accomplishes several functions. The first of these functions may be considered as the closure of the circuit from ground at 301 through the contact 150–2L and the wire 290 to the switch 208, thereby to afford a shunt circuit around the switch 209 to one terminal of the secondary T–2, this shunt circuit affording a holding circuit for the stepping relay 150 until such time as the actuating arm 195 of the stepping switch opens the switch 208. The second function accomplished upon actuation of the relay 150 is the immediate breaking of the energizing circuit to the solenoid valve 86–5, this being accomplished because of the disengagement of the relay contact 150–1 from the upper contact 150–1U. The third function that may be attributed to the stepping relay 150 is accomplished when the contact 150–1 engages the contact 150–1L, since this extends circuit from the line wire L2 and through the wire 305 to the operating solenoid 197 of the stepping relay. Thus the stepping relay will be operated so as to shift the contact arms 200A and 200B thereof to the next station wherein the arm 200A will be in contact with the contact A2 and the arm 200B will be in engagement with the contact B2. At the end of the clockwise rocking movement of the actuating arm 195 of the stepping switch as viewed in Fig. 11, the switch 208 will be opened, thereby to break the holding circuit for the stepping relay 150 and allow the same to resume its normal or released position. When this occurs the contact arms 200A and 200B of the stepping switch will be disposed in their No. 2 position so that the circuit that is extended from the contact A2 will immediately be energized upon release of the stepping relay 150, and the power control connection from the contact A2 will immediately take effect.

With respect to the circuit from the contact B2, the effectiveness is established when the return movement of the actuating arm 195 serves to close the switch 189, which occurs promptly upon deenergization of the solenoid 197.

At the time when the workpiece W is thus clamped in position on the spindle 25, the carriage 60 is located in its fully retracted or most right hand position as viewed in Fig. 1, and when the work clamping operation has been completed, it is desirable that the first tool such as the drill T1 be brought into alignment with the workpiece W. This is accomplished by the location of the stepping switch arms in their No. 2 position. Thus the contact A2 of the power control section of the stepping relay 140 is connected by means including a wire 314 to the wire 185–2 so that the circuit will be extended to the solenoid valve 86–2, thereby to cause the turret or slide 40 to be moved in a forward direction. In the present instance it will be observed that the wire 314 extends its connection to the contact A2 by means of a jumper wire 315 which is connected by branches 315–2, 315–6, 315–9 and 315–15 to the contacts A2, A6, A9 and A15 respectively, and the function of these jumper connections will become apparent as the description proceeds.

The contact B2 is connected by a wire 317 to the contact 235–4 so that this sensing contact is conditioned for closure when the slide 40 is moved forward to such an extent that the contact 230 engages the contact 235–4. Such engagement takes place when the drill T1 is disposed in alignment with the workpiece W, and the action of such circuit closure is to complete an energizing circuit to the stepping relay 150 so as to energize the stepping solenoid 197 and advance the switch arms of the stepping switch 140 to the No. 3 position thereof.

At the time when the sensing circuit to the contact 235–4 is conditioned by engagement of the arm 200B with the contact B2, another circuit is extended from the wire 317 by a wire 318 which extends to the lower end of the coil 142C of the starting relay 142 so that this starting relay is energized. When this occurs, the operating coil 145F of the starting contactor 145 is energized, and the operation of the starter is such as to afford a holding contact 145C so that the motor 29 will operate continuously in a forward direction so as to drive the spindle 25 in a forward direction until the holding circuit is released. This holding circuit includes a movable contact 145-3 that engages the contact 145C, and a wire 320 extends from the contact 145-3 to the contact 144-1U of the reversing relay. Thus, as will hereinafter become apparent, the operation of the reversing relay 144 is effective to break the holding circuit afforded for the coil 145F by the contact 145-3, thereby to enable reversal of the motor 29 to be attained. Thus it will be clear that during the time when the slide or turret 40 is being advanced to the new position with the tool T1 in alignment with the workpiece W, the spindle rotation will have been started, and when the completion of the sensing circuit to the sensing contact 235-3 has been completed, the machine will be in condition for advancing movement of the carriage 60. This is attained by circuits that are extended from the contact A3 of the power control section of the stepping relay.

Thus when the contact arms of the stepping relay are in their No. 3 positions, the circuit is extended from the contact A3 by means including a wire 322 to the wire 185-8, thereby to energize and open the solenoid valve 86-8 which is effective to impart rapid approach movement to the carriage 60. In the present instance such connection from the contact A2 includes a jumper 323 that is connected by branches 323-3, 323-7 and 323-10 to the contacts A3, A7 and A10 respectively, and the purpose of these additional connections will become apparent as the description proceeds.

At the time when the rapid approach solenoid 86-8 is thus energized, means including a wire 325 that extends from the contact B3 to the contact 225-2 serve to condition the sensing contact 225-2 for its controlling action. The connection that is thus afforded is arranged in the present instance to include a jumper wire 326 and branch connections 326-3, 326-7 and 326-10 that are extended respectively to the contacts B3, B7 and B10 for purposes that will hereinafter become apparent. Thus when the forward or rapid approach movement of the carriage 60 has progressed to such point that the contact 220 engages the sensing contact 225-2, a circuit will be extended to the stepping relay 150 thereby to immediately break the power connection to the solenoid 86-8 and at the same time energize the stepping solenoid 197. This advances the contact arms of the stepping switch to their No. 4 position, and the next operation of the machine is thereby immediately instituted.

When the contact arm 200A is thus moved into its No. 4 position, circuit is extended through means including a wire 328 to the feed solenoid valve 86-9, and this solenoid valve thus causes pressure liquid to be fed to the cylinder 70 through the valve 95 at a controlled rate suitable for performance of the required cutting operations by the tool T1. In the present instance, the wire 328 is connected to the contact A-4 by means including a jumper wire 329 and a branch 329-4, as will be evident in Fig. 11 of the drawings.

When the arm 200B is in its No. 4 position as aforesaid, the circuit is extended from the contact B4 by a wire 330 to the forward sensing contact 225-3 so as to thereby condition this contact for determining when the boring operation has been completed. Thus when the contact 220 has moved forwardly and into engagement with the conditioned sensing contact 225-3, an energizing circuit will be completed for the stepping relay 150, and thus the circuit to the feed valve 86-9 will be immediately broken, and the solenoid 197 will be energized so as to advance the arms of the stepping switch to the No. 5 position thereof.

When the arm 200A of the stepping switch engages a contact A5, the circuit is extended by means including a wire 332 to the wire 186-7, thereby to energize the carriage reverse solenoid valve 86-7, and this causes pressure liquid to be fed into the left hand end of the cylinder 70 so as to move the carriage 60 in a reverse or return direction. As will be evident in Fig. 11 of the drawings, the connection to the contact A5 is effected by means including a jumper 333 and branch leads 333-5, 333-8 and 333-11, the purpose of such additional branch leads being brought out hereinafter.

At the time when such reverse or return movement of the carriage 60 is thus instituted, circuit is also extended by means including a wire 335 to the rear sensing contact 225-1, thereby to condition this sensing contact for determining when the withdrawing movement of the slide has been completed. It will be observed in Fig. 11 of the drawings that this circuit that extends to the wire 335 includes a wire 336 and a jumper 337 that is connected by branch leads 337-5 and 337-8 to the contacts B5 and B8 respectively. Thus when the slide 60 has been withdrawn to its most right hand position so as to engage the contact 220 with the conditioned sensing contact 225-1, the circuit for the stepping relay 150 will be completed so as to break the power circuit to the solenoid valve 86-7 and at the same time cause the stepping relay 140 to be advanced so that the contacts thereof are disposed in the No. 6 position.

When the contact arms of the stepping switch 140 are thus disposed in the No. 6 position, a power circuit is extended from the contact A6 through the branch connection 315-6, the jumper 315, the branch 315-16 and the wire 314 to the wire 185-2, thereby to energize the solenoid valve 86-2 which causes the turret or slide 40 to be actuated in a forward direction. At this same time, a circuit is extended from the contact B6 through a wire 339 to the contact 235-4, thereby to condition this sensing contact for sensing the attainment of the next position of the slide 40 wherein the reaming and facing tool T2 will be aligned with the axis of the workpiece W. When this condition is attained, the contact 230 that is associated with the slide 40 will engage the conditioned contact 235-4, thereby to complete an energizing circuit for the stepping relay 150 and this relay will of course break the energizing circuit from the contact A6 to the valve 86-2 and will complete a circuit to the solenoid 197 of the stepping relay so as to advance the contacts thereof to the No. 7 position.

When the contact arms of the stepping relay are in the No. 7 position, a power circuit is extended from the contact A7 through the branch 323-7, the jumper 323, the branch 323-10 and the wire 322 to the wire 185-8, thereby to energize the rapid approach solenoid valve 86-8. At this time, a circuit is also extended from the contact B7 through the wire 325 to the central contact 225-2, which in this instance is effective to sense the completion of the reaming and facing operation. In this connection it will be observed that the contact 225–2 is the same one which has heretofore been utilized to sense the completion of the rapid approach movement with respect to the drill T1, and in order to enable the contact 225–2 to also serve as a sensing means in connection with the operation of the tool T2, it is essential that the longitudinal relationship between the tools T1 and T2 be established with this purpose in mind.

When the reaming and facing operation has been completed, the contact 220 on the carriage 60 engages the conditioned sensing contact 225–2, and this of course completes a circuit to the stepping relay 150 so that the energizing circuit to the rapid approach valve 86–8 will be immediately broken and the stepping relay will be advanced to the No. 8 position. With respect to the operation of the tool T2, it will be observed that the operations are relatively light and therefore the carriage 60 is fed at the rapid approach speed rather than at the feed speed during the cutting operations. This will of course vary in accordance with the type of work being performed. But in any event, with the control apparatus of the present invention, the desired operation of the carriage at a feed speed may readily be attained through the establishment of the circuits of the character hereinbefore described with respect to the operation of the drill T1.

When the stepping relay 140 has thus been advanced to position No. 8, a power circuit is established from the contact A8 through the wire 332 to the wire 185–7, thereby to energize the reverse solenoid 86–7 so as to cause the carriage 60 to be withdrawn in a right hand direction as viewed in Fig. 1. At this same time, a circuit is established through the wire 336 and the wire 335 to the sensing contact 225–1, thereby to condition this sensing contact for determining when the carriage has reached its most rearward position. When the contact 220 on the carriage 60 engages the condition contact 225–1, the energizing circuit for the stepping relay 150 is completed and the power connection to the solenoid valve 86–7 is broken and the stepping relay is advanced to its No. 9 position. This completes a power circuit through the contact A9, the branch 315–9, the jumper 315, the branch 315–16 and the wire 315 to the solenoid valve 86–2 which causes hydraulic liquid to be fed to the rear end of the cylinder 75. This causes the slide 40 to be advanced in a forward direction. At the same time, the circuit is extended through a wire 340 to the sensing contact 235–5, thereby to condition this contact for determining when the slide has moved to such a position that the tap T3 is aligned with the axis of the workpiece W. Thus when the slide 40 has reached this position, the contact 230 engages the conditioned sensing contact 235–5, thereby to energize the stepping relay 150 and cause immediate breaking of the energizing circuit to the valve 86–2 and to cause advancing or stepping of the stepping relay 140 to its No. 10 position.

When the contact arms of the stepping relay 140 are thus disposed in their No. 10 positions, a power circuit is extended from the contact A10 from the wire 322 to the wire 185–8, and this causes the rapid approach solenoid valve 86–8 to be energized. The carriage 60 is therefore advanced at a rapid approach speed toward the workpiece, and it might be noted in this connection that this rapid approach speed is utilized in the tapping operation.

In the No. 10 position of the stepping relay a circuit is extended from the contact B10 through the branch 326–10, the jumper 326, the branch 326–7 and the wire 325 to the contact 225–2, thereby to condition the sensing contact 225–2 for determining when the tapping operation has been completed. With respect to the tapping operation, it should be observed that the low pressure relief valve 98 serves to prevent undue endwise feeding pressure upon the tap, and thus proper formation of the threads in the longitudinal opening of the workpiece W is assured. When the completion of the tapping operation has been sensed by engagement of the contact 220 with the conditioned sensing contact 225–2, a circuit is extended to the stepping relay 150 which immediately breaks the power circuit to the solenoid valve 86–8 and causes advancing or stepping movement of the stepping relay 140 to its No. 11 position.

In the No. 11 position of the stepping relay a power circuit is extended from the contact A–11 through the wire 333–11, the jumper 333, the branch 333–8, the wire 332 to the wire 185–7, thereby to complete an energizing circuit to the carriage return valve 86–7, and this supplies hydraulic liquid to the left hand end of the carriage actuating cylinder 70 so as to cause return or right hand movement of the carriage. At the time when the return solenoid 86–7 is thus energized to cause return movement of the carriage 60, a circuit is extended from the contact B11 by a wire 342 to the lower end of the operating coil 144C of the reversing relay 144, and this relay is therefore energized so as to cause reversal of the spindle driving motor 29. In this respect it will be observed that the contact 144–1 is in this operation of the reversing relay 144 disengaged from the contact 144–1U so as to break the holding circuit for the forward operating coil 145F of the reversing contactor, and the contact 144–1 engages the lower contact 144–1L so as to complete an energizing circuit to the operating coil 145R of the contactor 145.

When the reversing relay 144 is thus operated, it serves to establish a sensing circuit for determining when the withdrawing movement of the carriage 60 has been completed. Thus a wire 346 is extended from the contact 144–2L to the wire 335, which it will be recalled extends to the sensing contact 225–1. Thus when the return movement of the carriage 60 has been completed so as to engage the contact 220 with the conditioned contact 225–1, an energizing circuit for the stepping relay 150 will be completed so as to deenergize the solenoid valve 86–7 and cause the stepping relay 140 to be advanced to its No. 12 position.

With respect to the withdrawing movement of the tap while the stepping relay is in its No. 11 position, it should be observed that the low pressure relief valve 97 assures that excessive withdrawing pressure will not be applied to the tap, and hence the threads in the workpiece will not be injured in the withdrawing operation.

When the contact arms of the stepping relays are thus moved from the No. 11 position to the No. 12 position, it will be observed that the circuit for the reversing relay 144 will be broken, and hence the motor 29 will stop.

When the contact arms of the stepping relay 140 are disposed in the No. 12 position, a power circuit is extended from the contact A12 and a wire 348 to the wire 185–1, and this energizes the solenoid valve 86–1 so as to cause hydraulic liquid to be supplied to the forward end of the cylinder 75. This causes the slide 40 to be moved in a rearward direction. The location of the stepping relay in its No. 12 position also extends a circuit from the contact B12 through a wire 349 to the contact 235-1, thereby to condition this sensing contact for determining when the slide 40 has been disposed in its most rearward or unloading position. Thus when the contact 230 engages the conditioned sensing contact 235-1, a circuit will be completed to the stepping relay 150 so as to cause the solenoid valve 86-1 to be deenergized and to cause the stepping relay 140 to be advanced to its No. 13 position.

In the No. 13 position of the stepping relay, a power circuit is extended from the contact A13 through a wire 350 to the solenoid valve 88-6, thereby to open this valve and cause pressure fluid to be supplied to the right hand end of the clamp operated cylinder 55. The work clamping jaws are thus moved to their released or unclamped positions, and this unclamped condition is detected by closure of the pressure operated sensing switch 280 that is associated with the pipe 89-6. Thus a wire 352 is extended from the contact 280S to this switch to the contact B13 of the stepping switch, and when the unclamped condition is detected, the switch 280 extends an energizing circuit to the stepping relay so as to cause the stepping switch to be advanced to its No. 14 position.

In the No. 14 position of the stepping switch, a power circuit is extended from the contact A14 through a wire 356 to the wire 185-3, and this energizes the solenoid valve 86-3 so as to feed pressure liquid to the left hand end of the work feed cylinder 38. The related sensing circuit is at this same time extended from the contact B14 through a wire 358 to the contact 255-2, and the arrangement or positioning of the contact 255-2 is such that this contact will be engaged by the contact 256 at the time when the completed workpiece W has been moved to a position just beyond the end of the jaws 43H. At this position, the completed workpiece will be released so that it may drop downwardly and on to a suitable discharge chute (not shown), and when this occurs, the sensing contact 255-2 will have been engaged so as to complete an energizing circuit to the stepping relay 150. This causes the energizing circuit to the solenoid valve 86-2 to be broken, and at the same time causes the stepping relay 140 to be advanced to its No. 15 position.

In the No. 15 position of the stepping relay, a circuit is extended from the contact A15 through the wire 314 to the wire 185-2, thereby to energize the solenoid valve 86-2. This serves to supply hydraulic liquid to the slide operating cylinder 85, thereby to move the slide 40 in a forward direction. A circuit is at this same time extended from the contact B15 through a wire 360 to the sensing contact 235-2, thereby to condition this sensing contact for determining when the stop S has been disposed in alignment with the axis of the spindle 25. When this condition is detected by engagement of the contact 230 with the conditioned sensing contact 235-2, a circuit is extended to the stepping relay 150 so as to thereby break the energizing circuit to the solenoid 86-2 and cause advancing movement of the stepping relay to its No. 16 position.

In the No. 16 position of the stepping switch a circuit is extended from the contact A16 through a wire 362 to the wire 185-4 and this supplies pressure liquid to the right hand end of the work feeding cylinder 38, thereby to withdraw the work feeding plunger 39 in a left hand direction. When the stepping switch is in this No. 16 position, a circuit is extended from the contact B16 through a wire 364 to the contact 255-1, thereby to condition this sensing contact for determining when the plunger 39 has been withdrawn to a point somewhat to the left of the work supply chute 36, thus to allow the next workpiece to move downwardly along the chute into the path of the plunger 39. When this fully withdrawn condition is detected by engagement of the contact 250 with the conditioned sensing contact 255-1, an energizing circuit is completed to the stepping relay 150 so as to break the energizing circuit to the valve 86-4 and at the same time cause advancing movement of the stepping relay to its No. 17 position.

When the contact arms of the stepping switch are disposed at position 17, a circuit is extended from the contact A17 through a conductor 370 to the wire 356 and thence to the wire 185-3, and this serves to again energize the solenoid valve 86-3 so as to initiate right hand or work feeding movement of the work feeding plunger 39. Thus a new workpiece is moved in an endwise direction partially out of the lower end of the supply chute 36, and this movement is transmitted to the series of workpieces within the spindle 25, thereby to move the right hand end of the leading workpiece W into abutment with the stop S which is at this time aligned with the axis of the spindle 25.

The location of the switch arms of the stepping switch in the No. 17 position also serves to extend circuit from the contact B17 through a wire 372 to the pressure switch 260 so as to thereby condition this pressure switch for detecting the completion of the work advancing movement. Thus when engagement of the workpiece with the stop S causes pressure to be built up in the pipe 89-3, the switch 260 is closed and an energizing circuit is completed to the stepping relay 150. This of course acts to break the energizing connection for the solenoid valve 86-3 while at the same time causing the stepping switch to advance to its No. 18 position.

The workpiece W is thereby disposed in position to be clamped in the manner hereinbefore described, and means are therefore effective to cause the stepping switch to advance through what may be termed an idle movement until the contact arms thereof return to the No. 1 position thereof. For this purpose, a jumper 374 that is grounded at 375 is connected in parallel with the contacts B18 to B24 inclusive by means such as branch leads 374-1. Hence the stepping relay 150 will be energized when the contact arms are shifted or advanced in the manner above described to the No. 18 position, and such advancing movements will be repeated as the contact arms are successsively positioned in positions 19 to 24 inclusive. Thus the stepping switch will automatically return to its No. 1 position and the cycle of operations above described will be repeated.

It will be evident that the control apparatus of the present invention may be readily and easily set up for different kinds and sizes of work and for the performance of different working operations and cycles with respect thereto. Such revision of the setup requires only that an analysis of the desired cycle be made, that the sensing means be adjusted, and that power control circuits and sensing control circuits be connected with the contacts A and B of the stepping switch in accordance with such analysis.

For purposes of disclosure the invention has been embodied in an automatic turret lathe, but the broad applicability and flexibility of the control apparatus of the present invention is such that similar automatic control may be readily attained in respect to a wide variety of automatic apparatus or machines that fall in arts other than the machine tool art.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claim:

I claim:

In an actuating and control apparatus for an automatic machine which has a plurality of independently operable mechanisms each operable through one or more working movements, independent power means for actuating each of the operative mechanisms of such a machine through the desired working movements thereof, independent sensing means sensing the completion of such working movements, a stepping switch having a plurality of control positions in which said switch may be successively set and embodying a power control section and a sensing control section each of which has control contacts in each of said control positions, said control positions being allocated in succession to said working movements in the order in which they are to occur in a machine cycle, and the control contact in the power control section at each position having a power circuit extended therefrom and operatively associated with the related power means to cause operation thereof through the working movements to which such position is allocated and the control contact in the sensing control section of each position being operatively associated with the related sensing means to condition the same for sensing the completion of the working movement to which the position is allocated, operating means for imparting stepping movements to said stepping switch, a stepping relay having normally closed contacts included in series with each such power circuit and having normally open contacts affording a circuit for causing operation of said operating means, and an energizing circuit for said stepping relay arranged for closure under control of the effective one of said sensing means to thereby break the effective power circuit and cause advancing of said stepping switch from one position to another.

ROBERT H. HILL.

References Cited in the file of this patent

UNITED STATES PATENTS

| Number | Name | Date |
|---|---|---|
| 379,577 | Horton | Mar. 20, 1888 |
| 1,527,791 | Flanders | Feb. 24, 1925 |
| 2,116,376 | Anderson | May 3, 1938 |
| 2,155,573 | Wells | Apr. 25, 1939 |
| 2,289,957 | Godfriaux | July 14, 1942 |
| 2,343,375 | Herman | Mar. 7, 1944 |
| 2,348,908 | Jacobs | May 16, 1944 |
| 2,352,184 | Bullard | June 27, 1944 |
| 2,384,809 | Bullard et al. | Sept. 18, 1945 |
| 2,427,493 | Bullard | Sept. 16, 1947 |
| 2,445,544 | Trautman | July 20, 1948 |